May 4, 1937.  K. J. BAKER  2,079,274

FLEXIBLE CONDUIT FOR ELECTRICAL WIRES

Filed Feb. 24, 1936

Kilian J. Baker INVENTOR.

BY

H. G. Burns ATTORNEY.

Patented May 4, 1937

2,079,274

UNITED STATES PATENT OFFICE 2,079,274

FLEXIBLE CONDUIT FOR ELECTRICAL WIRES

Kilian J. Baker, Fort Wayne, Ind.

Application February 24, 1936, Serial No. 65,196

2 Claims. (Cl. 247—39)

This invention relates to improvements in flexible conduits for electrical wires to sustain them in orderly arrangement when laid over the floor of a building. Ordinarily, there are used extension wires that connect portable electric lamps with wall sockets or other sources of electrical energy, telephones, buzzers, signal controllers and other instruments that are connected by extension wires with terminal boxes located at points more or less remote from a desk or other places where such instruments are used. Such extension wires are frequently laid upon the floor exposed to danger of being trampled upon or disarrangement by persons walking upon the floor, or causing persons walking to stumble because of the obstruction of the wires.

An object of the invention is to provide a sheltering strip or conduit for the wires that retains the wires in proper arrangement over the floor without obstructing persons walking over them. Another object is to form the strip so as to permit insertion and retention therein of the wires of several independent circuits in spaced relation with each other so as to obviate short circuiting between the several circuits or other electrical interferences. Other objects and advantages of the invention will appear in the following description.

An illustrative embodiment of the invention is shown in the accompanying drawing, in which:—

Figure 1:
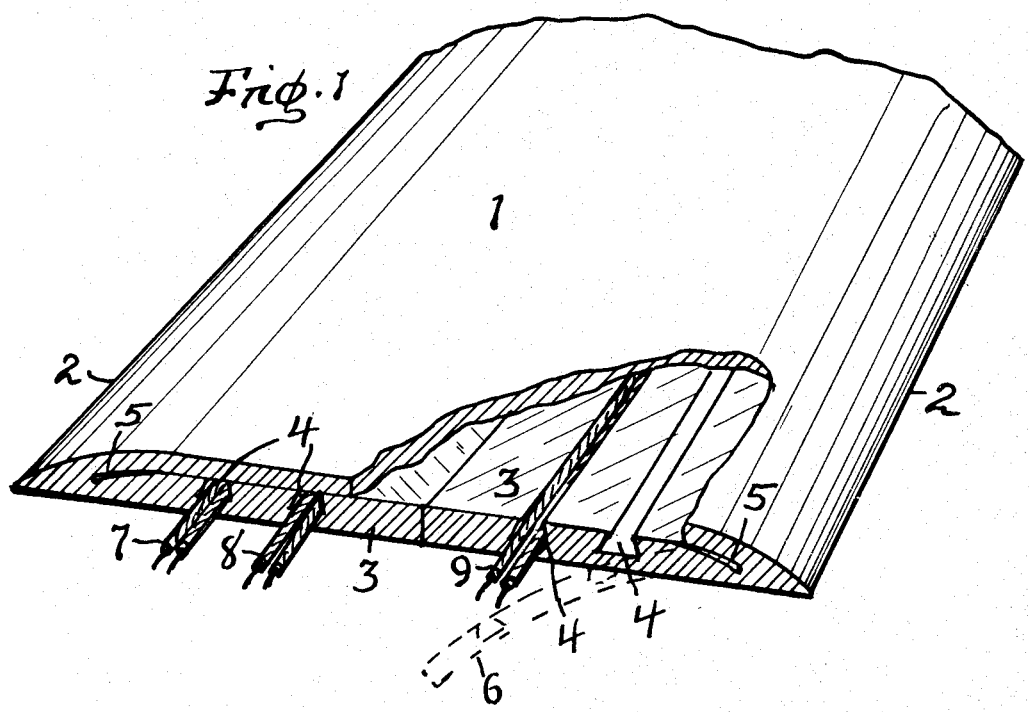
Figure 2:
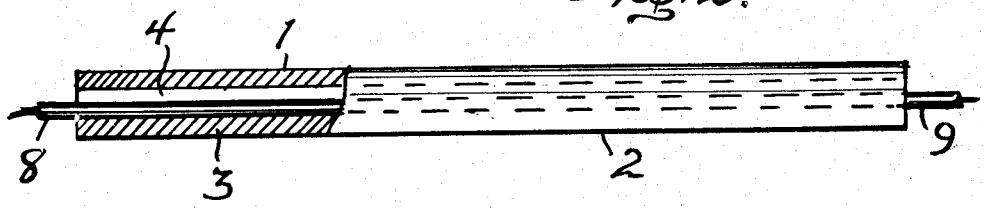

Fig. 1 is a fragmentary perspective view of a conduit showing a preferable form of construction in which the invention is disclosed; and Fig. 2 is a side elevation of the conduit, illustrated in Fig. 1, a portion thereof being in section.

The illustrative embodiment of the invention consists of a strip of elastic material, such as of a suitable rubber composition, shaped to have a cover portion 1 with feather-edged sides 2 and underlying flaps 3 that extend inwardly from the outer marginal portions of the strip to a line extending longitudinally of the strip located preferably midway between the sides of the strip, where said flaps meet. Each flap has made therein channels 4 in its upper surface that extend longitudinally with respect to the strip and spaced suitably apart. The channels 4 preferably are of dovetail formation in cross-section and of greater width at the bottom as compared with that of the top. The cover portion 1 of the strip lies flat upon the upper surfaces of the flaps 3 so that the channels 4 at the tops are closed thereby.

The outer marginal portions of the flaps 3 are made integral with the corresponding side marginal portions of the strip, and the inner channeled portions of said flaps that underlie the cover portion 1 which extend from the points indicated by 5 to their inner edges, are unattached from said cover portion and are adapted to be flexed downwardly as indicated by the dotted outline 6 whereby to permit insertion in said channels of circuit wires, such as indicated by 7, 8 and 9. The normal tendency of the flaps is to lie against the under face of the cover portion 1 of the strip so that when the strip is laid upon the floor the circuit wires are securely confined in the respective channels by the overlying portion 1 of the strip.

The strip thus formed with its feather-edged sides, while lying upon the floor affords complete concealment of the circuit wires without causing more than negligible obstruction to the movement of persons walking over the floor. Also, the strip thus constructed admits of the use of an overlying rug or other floor covering (not shown) without material distortion to its normal plane.

A salient feature of the invention is that the entire strip is unitary with respect to its several parts and is flexible throughout so that it lies limp and unobstructive upon the floor, and the flaps being pliant admits of the ready insertion into and removal from of the circuit wires as occasion may require.

I claim:—

1. A conduit for extension wires of electrical circuits, made of pliant insulating material, in the form of a strip constituted of a cover portion, the sides of said strip being feather-edged, and provided with flaps that extend inwardly from the outer margins of the strip with which they are integral and underlie said cover portion, each of said flaps having one or more channels that extend longitudinally with respect to the strip and which are of dovetail formation in cross-section and open through their tops, said flaps being adapted to be flexed away from the overlying cover portion to permit insertion into the channels of said extension wires to be secured therein and concealed by said cover portion when the flaps are returned to normal position.

2. A pliant conduit for protecting electrical conductors over a floor, said conduit consisting of a strip constituted of a cover portion and underlying longitudinally channeled flaps that extend inwardly from the corresponding sides of said strip, said flaps being adapted to be flexed away from the overlying cover portion to permit insertion into said channels of electrical conductors, said electrical conductors to be secured therein and concealed by said cover portion when the flaps are in normal position.

KILIAN J. BAKER.